United States Patent Office 2,884,453
Patented Apr. 28, 1959

2,884,453

REACTION OF METAL FLUORIDES WITH THIOPHOSGENE AND PERCHLOROMETHYL MERCAPTAN

Charles W. Tullock, Wilmington, Del., assignor to E. I. du Pont de Nemours and Company, Wilmington, Del., a corporation of Delaware No Drawing. Application July 31, 1957
Serial No. 675,275

9 Claims. (Cl. 260—543)

This invention relates to a new process of preparing compounds containing the trifluoromethylthio radical.

An object of this invention is to provide a new and simple method of preparing bis(trifluoromethyl)disulfide, $CF_3S$—$SCF_3$, and trifluoromethanesulfenyl chloride, $CF_3SCl$, from relatively inexpensive reactants. Both of these trifluoromethylthio compounds are valuable intermediates for the preparation of other useful compounds containing the trifluoromethylthio group, such as the fungicidal bis(trifluoromethylthio)mercury. Furthermore, they are both useful as sources of highly valuable fluorocarbons, such as carbon tetrafluoride and tetrafluoroethylene, by reaction with carbon at high temperatures, especially at temperatures in excess of 1500° C. Trifluoromethanesulfenyl chloride, which is a gas at ordinary temperatures, is useful as a fumigant and animal pest killer. Bis(trifluoromethyl)disulfide is known to react with chlorine at elevated temperature to give chlorotrifluoromethane, a valuable low temperature refrigerant, and sulfur monochloride.

The novel process comprises reacting an alkali metal fluoride with a thiocarbonyl chloride of the formula $CSCl_n$, where $n$ is 2 or 4, under substantially anhydrous conditions at an elevated temperature. At least one of the compounds bis(trifluoromethyl)disulfide and trifluoromethanesulfenyl chloride is formed.

The mechanism of this reaction, and particularly the formation of bis(trifluoromethyl)disulfide, is not fully understood. Depending upon the reaction conditions, one or the other of the two trifluoromethylthio reaction products predominates. The alkali metal chloride corresponding to the alkali metal fluoride is also formed in the reaction.

The inorganic starting material is one of the alkali metal fluorides. In the examples which follow, sodium and potassium fluorides have been used but other alkali metal fluorides are suitable, especially the fluorides of alkali metals having atomic number at least 11, e.g., rubidium and cesium fluorides. The alkali metal fluoride should be used in a substantially anhydrous state.

For the organic reactant there can be used either thiocarbonyl chloride (thiophosgene) $CSCL_2$, or thiocarbonyl perchloride, $CSCl_4$. The latter is also often called trichloromethanesulfenyl chloride, or perchloromethyl mercaptan, and is represented by the formula $CCl_3SCl$. The two reactants are very closely related since thiocarbonyl chloride is obtained by reduction of thiocarbonyl perchloride (Organic Syntheses, Coll. vol. I, p. 493), and thiocarbonyl perchloride is believed to exist in the form $Cl_2S$=$CCl_2$ (J. Chem. Soc. 1934, 822). Both reactants are derived from carbon disulfide and chlorine and are therefore inexpensive.

The relative proportions of the reactants are not critical since they affect only the extent of the conversion to trifluoromethylthio compounds. In general, the reactants are used in such proportions that the atomic ratio of fluorine to chlorine is from about 0.5:1 and lower to about 10:1 and higher. The best conversions are obtained when the ratio is at least 1:1. This means that there is desirably used at least 4 moles of alkali metal fluoride per mole of trichloromethanesulfenyl chloride, or 2 moles of alkali metal fluoride per mole of thiocarbonyl chloride.

It is desirable to operate at a temperature at least high enough to achieve a practical rate of reaction. This temperature will ordinarily be at least about 100° C. The upper limit of temperature is dictated only by the decomposition point of the reactants and reaction products, but in general it is unnecessary to exceed about 300° C., and the preferred reaction temperature lies in the range of 150–250° C., especially with trichloromethanesulfenyl chloride, which reacts more slowly than thiocarbonyl chloride. Substantial conversions are in general achieved within one to four hours at reaction temperature, although longer reaction times can be used if desired.

The reaction can be carried out in the absence of any solvent or diluent. For example, a mixture of alkali metal fluoride and thiocarbonyl chloride or thiocarbonyl perchloride, may be conveniently heated in a sealed pressure vessel in view of the rather low boiling points of the organic reactants. If the reaction is to proceed at atmospheric pressure a high-boiling medium will ordinarily be used. Alternatively, the chlorine-containing reactant may be passed over a hot bed of alkali metal fluoride at or near atmospheric pressure and then recycled to provide sufficient contact time.

If desired, a substantially anhydrous organic liquid reaction medium such as an aromatic hydrocarbon or halogenated hydrocarbon can be added to facilitate contact, but there is no particular advantage in doing so. However, organic reaction media of a special type are advantageous in that their use generally leads to higher conversions to trifluoromethylthio compounds or permits lower reaction temperatures. These particular media are organic compounds, liquid under the operating conditions, which have a high dielectric constant of at least 20 when measured at or above 20° C.

The function of the high dielectric constant media is not clearly understood. It is possible that they solvate the chlorine atoms, making them more reactive, or that they ionize the thiocarbonyl chloride or perchloride. The suitability of a liquid medium of this type is not connected with its ability to dissolve the alkali metal fluoride, since many of them have little or no solvent action on these salts. However, the reaction medium should be one in which the chlorine-containing reactant should be at least partly soluble, for example to the extent of 20% by weight. Preferably, the reaction medium is miscible with the thiocarbonyl chloride or thiocarbonyl perchloride.

The reaction medium need not be completely inert toward the reactants. However, it is desirable that the reaction medium be one that is not readily attacked by the reactants under the operating conditions to prevent an adverse effect on the conversions. There is a simple visual test whereby undesirably reactive reaction media can be recognized. This consists in maintaining in contact for a few moments at elevated temperature, e. g., 70° to 100° C., the thiocarbonyl chloride or perchloride with an excess of the medium being tested. A highly reactive medium, under these conditions, will discharge the characteristic color of the reactant (red for $CSCl_2$, yellow for $CSCl_4$), usually with considerable heat evolution and gas evolution. Thus, certain liquids can readily be recognized as unsuitable in spite of their favorable dielectric constants. These include principally compounds which evolve methane in the well known Zerewitinoff test and therefore contain active hydrogen, that is, hydrogen attached to oxygen, nitrogen or sulfur.

The amount of reaction medium present in the reaction mixture is not critical. It need only be sufficient to keep the mixture fluid and to insure contact between the reactants. In practice, the weight of reaction medium used is at least equal to the weight of alkali metal fluoride.

Suitable reaction media, all having a dielectric constant of at least 20 when measured at or above 20° C. include acetonitrile, propionitrile, butyronitrile, adiponitrile, benzonitrile, nitromethane, nitroethane, 1-nitropropane, 2-nitropropane, nitrobenzene, o-nitrotoluene, p-nitrotoluene, 1-chloro-2-nitrobenzene, methyl-o-nitrobenzoate, dimethyl sulfate, diethyl sulfate, cyclic tetramethylene sulfone, di-n-butyl sulfone, methyl ethyl sulfone, ethyl phenyl sulfone, etc. The preferred reaction media, because of their inertness under the operating conditions, are the nitriles and sulfones which, except for the functional groups, are hydrocarbon.

If the reaction is carried out at atmospheric pressure in open vessels, the volatile reaction products are permitted to escape as they form, and are led to cold traps where they condense. When the reaction proceeds in sealed pressure vessels, the vessel is cooled down at the end of the heating period. The volatile products are then removed from the vessel by evaporation, if desired under reduced pressure, and condensed in cold traps.

The volatile material contains trifluoromethanesulfenyl chloride, B. P. about 0° C., and bis(trifluoromethyl)-disulfide, B. P. about 35° C. There may also be present various by-products such as thionyl fluoride, $SOF_2$; sulfuryl fluoride, $SO_2F_2$; carbon oxysulfide, silicon tetrafluoride, carbon dioxide, trichlorofluoromethane, etc. Small amounts of bis(trifluoromethyl) polysulfides $$CF_3(S)_nCF_3$$

where $n$ is 3 or 4, are often found. These various compounds are detected by infrared or mass spectrometric analysis and their presence is confirmed by nuclear magnetic resonance spectral analysis.

The trifluoromethanesulfenyl chloride and bis(trifluoromethyl)disulfide can be isolated in a satisfactory state of purity by fractionation of the mixture through an efficient column in a low temperature still, operating at atmospheric pressure. In syntheses using thiocarbonyl chloride, the bis(trifluoromethyl)disulfide formed contains carbon disulfide. These two products are conveniently separated by freezing the mixture, whereby they form two distinct layers.

The following examples ilustrate the invention in greater detail:

*Example I*

In a glass flask provided with a spiral condenser, a dropping funnel and a thermometer was placed 200 g. of sodium fluoride and 300 ml. of cyclic tetramethylene sulfone. Through the dropping funnel was added 202 g. of trichloromethanesulfenyl chloride over a period of 2 minutes. The mixture was heated up to 209° C. with intermittent shaking over a period of 1.75 hours and then at 209–247° C. for 2.75 hours. During this time, the gaseous reaction products escaping through the condenser were led to a trap cooled in a carbon dioxide/acetone mixture.

Distillation of the material condenser in the cold trap gave the following fractions.

| | G. |
|---|---|
| I. B.P., −41.5 to −6° C. | 6 |
| II. B.P., −4 to +2° C. | 42 |
| III. B.P., 7.5 to 27° C. | 5 |
| IV. B.P., 27 to 37° C. | 22 |
| V. Residue | 9 |

Mass spectrometric analysis indicated that II was essentially pure trifluoromethanesulfenyl chloride, $CF_3SCl$, and that IV was bis(trifluoromethyl)disulfide, $CF_3SSCF_3$, containing also, on a molar basis, 3% of chlorodifluoromethanesulfenyl chloride, $CF_2ClSCl$; 2% of carbon tetrachloride; 0.7% of carbon disulfide; 1.3% of carbon dioxide; 0.5% of bis(trifluoromethyl)trisulfide, $$CF_3SSSCF_3$$

and 0.1% of bis(trifluoromethyl)tetrasulfide $$CF_3SSSSCF_3$$

Distillation of the residue (Fraction V) gave an additional 2 g. of $CF_3SSCF_3$, and 2.0 g. boiling at 71–98° C. which was chiefly $CF_3SSSCF_3$. Nuclear magnetic resonance analysis provided additional evidence for the presence of these polysulfides.

Infrared analysis showed that Fraction I contained, on a molar basis, 30% thionyl fluoride, 15% sulfuryl fluoride, 10% carbon oxysulfide, 5% silicon tetrafluoride, and 5% carbon dioxide, the remainder being trifluoromethanesulfenyl chloride.

Chloride ion analysis of the solid reaction product indicated that nearly 70% of the chlorine introduced as $CCl_3SCl$ had been converted to sodium chloride.

*Example II*

Using the same apparatus as in Example I, a mixture of 110 g. of sodium fluoride, 206 ml. of cyclic tetramethylene sulfone and 112 g. of thiophosgene was heated with intermittent shaking at 89–122° C. for 3.25 hours, then at 166–245° C. for 0.5 hour. Distillation of the product condensed in the cold trap gave 39 g. of material boiling at 31–34° C. Mass spectrometric analysis indicated that this product was bis-(trifluoromethyl)disulfide containing about 11% by weight of carbon disulfide. The latter can be separated by chilling the mixture, which results in the formation of two layers, the upper one of which is the carbon disulfide layer.

Chloride ion analysis of the solid reaction product indicated that 87% of the chlorine introduced as $CSCl_2$ had been converted to sodium chloride.

*Example III*

A mixture of 100 g. of sodium fluoride and 100 g. of trichloromethanesulfenyl chloride, without additional reaction medium, was placed in a 1-liter bomb constructed of the commercially available alloy of nickel, iron and molybdenum known as "Hastelloy" C. The bomb was heated at 125° C. for one hour, then at 200° C. for 3 hours. The volatile reaction product (25 g.) was found to contain, on a molar basis, 9–10% $CF_3SSCF_3$; 37–41% $CF_3SCl$; 24–27% $CFCl_3$; 1.6% $CF_2Cl_2$; 11.5–12.5% $CCl_4$, and 8% $CS_2$. In addition, there were traces of $CF_3SSSCF_3$ and $ClF_2CSCl$. Chloride ion analysis of the solid reaction product indicated that about 31% of the chlorine introduced as $CCl_3SCl$ had been converted to sodium chloride.

*Example IV*

A mixture of 100 g. of sodium fluoride, 101 g. of trichloromethanesulfenyl chloride and 150 ml. of acetonitrile was heated in a 1-liter "Hastelloy" C bomb at 125° C. for one hour, then at 200° C. for 3 hours. Twenty grams of the volatile product consisted of essentially pure bis(trifluoromethyl)disulfide, B.P. 34–40° C. Chloride ion analysis of the solid reaction product indicated that about 68% of the chlorine introduced as $CCl_3SCl$ had been converted to sodium chloride.

*Example V*

A 1-liter "Hastelloy" C bomb was evacuated free of air and charged with 112 g. of thiophosgene and 140 g. of potassium fluoride without added diluent. The bomb was heated with rocking at 125° C. for one hour, then at 235° C. for 6 hours. The volatile reaction product (67 g.) was collected in a cold stainless steel cylinder and distilled. The following three fractions were separated: (A), 15 g., B.P. +5 to 34.5° C.; (B), 26 g., B.P. 39–55° C.; (C), 11 g., B.P. 60–76° C. Infrared analysis showed that fraction (A) contained, on a molar basis, 20–25% of bis(trifluoromethyl)-disulfide, 40% of carbon disulfide, 25% of trichlorofluoromethane and about 5% of carbon oxysulfide. Fraction (B) was mainly carbon disulfide, containing up to 10 mole percent of bis(trifluoromethyl)-disulfide; and fraction (C) was mainly carbon tetrachloride. Chloride ion analysis of the solid reaction product indicated that about 11.9% of the chlorine in the thiophosgene had been converted to chloride ion.

I claim:

1. A process comprising reacting a compound of the group consisting of thiophosgene and trichloromethanesulfenyl chloride with an alkali metal fluoride under substantially anhydrous conditions and at a temperature of at least 100° C., the atomic ratio of fluorine to chlorine in the reaction system being between 0.5:1 and 10:1.

2. The process of claim 1 wherein the reaction takes place in a liquid organic medium having a dielectric constant of at least 20 when measured at a temperature of at least 20° C.

3. The process of reacting thiophosgene with an alkali metal fluoride under substantially anhydrous conditions and at a temperature of from 100 to 300° C., the atomic ratio of fluorine to chlorine in the reaction system being between 0.5:1 and 10:1.

4. The process of claim 3 wherein the ingredients are reacted in the proportion of at least two moles of alkali metal fluoride per mole of thiophosgene.

5. The process of reacting trichloromethanesulfenyl chloride with an alkali metal fluoride under substantially anhydrous conditions and at a temperature of from 100 to 300° C., the atomic ratio of fluorine to chlorine in the reaction system being between 0.5:1 and 10:1.

6. The process of claim 5 wherein the ingredients are reacted in the proportion of at least four moles of alkali metal fluoride per mole of trichloromethanesulfenyl chloride.

7. The process of claim 1 in which the alkali metal fluoride is sodium fluoride.

8. The process of claim 1 in which the alkali metal fluoride is potassium fluoride.

9. The process of claim 2 wherein said liquid organic medium is selected from the group consisting of nitriles and sulfones.

No references cited.